United States Patent [19]

Yamagishi

[11] Patent Number: 4,651,256
[45] Date of Patent: Mar. 17, 1987

[54] ESCUTCHEON AND MASK MOUNTING STRUCTURES FOR A CATHODE RAY TUBE

[75] Inventor: Yasufumi Yamagishi, Oosato, Japan

[73] Assignee: Sanyo Electric Co., Ltd., Moriguchi, Japan

[21] Appl. No.: 788,754

[22] Filed: Oct. 18, 1985

[30] Foreign Application Priority Data

Oct. 25, 1984 [JP] Japan .................. 59-161515[U]

[51] Int. Cl.⁴ .................................... H04N 5/645
[52] U.S. Cl. ................................ 361/423; 312/7.2; 358/255
[58] Field of Search ................ 361/423, 390, 399; 358/255, 254, 245; 364/708; 312/7.2

[56] References Cited

U.S. PATENT DOCUMENTS 3,614,519 10/1971 Figlewicz et al. ............. 358/245

FOREIGN PATENT DOCUMENTS 43666 10/1982 Japan .

Primary Examiner—A. D. Pellinen
Assistant Examiner—Morris Ginsburg
Attorney, Agent, or Firm—W. G. Fasse; D. H. Kane, Jr.

[57] ABSTRACT

A mask and an escutcheon are constructed a separate parts. The mounting section where the mask is attached to an internal chassis is formed with an elongated opening or notch for slidably receiving a mounting screw, so that the mounted position of the mask is adjustable longitudinally relative to of a cathode ray tube. The outer periphery of the mask has a flange opposite to the back of the end portion of the escutcheon when the mask and escutcheon are mounted in position for covering a gap between the separate mask and the escutcheon, whereby any position variation of the separate mask relative to the fixed position of the metal fixture of the cathode ray tube will not disturb the front view of the cathode ray tube, since such variation merely changes the depth of the groove or gap between the separate mask and escutcheon.

9 Claims, 9 Drawing Figures

ESCUTCHEON AND MASK MOUNTING STRUCTURES FOR A CATHODE RAY TUBE

FIELD OF THE INVENTION

This invention relates to a mounting structure for an escutcheon and mask applied around the peripheral edge of a cathode ray tube and more particularly it relates to a structure for mounting an escutcheon and a mask around the peripheral edge of a cathode ray tube housed in a cabinet in an apparatus which uses a cathode ray tube as a display, such as a portable computer or a word processor.

DESCRIPTION OF THE PRIOR ART

FIG. 1 is a perspective view showing the external appearance of an example of a conventional portable computer using a cathode ray tube as a display. In this figure, a cathode ray tube 2 together with many other known electronic parts is housed in a cabinet 1. The front of the cabinet 1 has an escutcheon 3 mounted thereon to surround the peripheral edge of the cathode ray tube 2. The portion of the escutcheon 3 located around the cathode ray tube is formed as a mask portion 3a which is often colored with a color different from that for the other portion of the escutcheon 3 to provide different design effects.

In a conventional display using a cathode ray tube, as disclosed, for example, in Japanese Utility Model Publication No. 43666/1982, the mask portion around the cathode ray tube is constructed as an integral part of the escutcheon. FIG. 2 is a sectional view showing a mounting structure for an escutcheon in such conventional device. In FIG. 2, the escutcheon 3 is mounted on a metal fixture 4 fixed to the cathode ray tube 2, with a spacer 5 interposed between the fixture 4 and the escutcheon. The spacer 5 serves to eliminate the clearance between the mask portion 3a of the escutcheon 3 and the surface of the cathode ray tube 2. More particularly, since the mounted position of the metal fixture 4 is not constant for all cathode ray tubes to be used but varies with them, it has been common practice to prepare spacers of different thicknesses for selective application of a spacer of suitable thickness in the mounting operation.

As described above, in the conventional display, it is necessary to prepare various spacers 5 different in thickness and selectively use a spacer 5 having a thickness appropriate to the fixed position of the metal fixture 4; thus, the operation of mounting the escutcheon 3 is troublesome and the operating efficiency is not high.

The mask portion 3a around the cathode ray tube 2 is often colored with a color different from that for the other portion of the escutcheon 3 to satisfy different design effects, as described above. In the prior art, however, since the mask portion 3a is an integral part of the escutcheon 3, it is necessary to apply a masking before painting; thus, the painting work has been difficult.

SUMMARY OF THE INVENTION

Accordingly, an object of the invention is to provide an escutcheon and mask mounting structure around the peripheral edge of a cathode ray tube, which facilitates the mounting of the escutcheon and mask and makes it possible to color the escutcheon and mask with different colors without having to apply a masking before painting.

In brief, this invention constructs a mask member and an escutcheon as separate parts, enabling the mounted position of the mask member to be adjusted longitudinally of a cathode ray tube by mounted position adjusting means when mounting the mask member on an internal chassis to which the cathode ray tube is fixed, and forming the mask member with a flange adapted to be opposed to a portion of the back of the escutcheon.

According to this invention, the mounted position of the mask member can be freely adjusted longitudinally of the cathode ray tube by mounted position adjusting means, even if the fixed position of the metal fixture of the cathode ray tube varies the clearance between the mask and the cathode ray tube. In that case the clearance can be always eliminated without preparing spacers of different thicknesses for selective use as in the prior art. This feature greatly simplifies the mounting of the escutcheon and mask.

Further, according to this invention, since the mask member is provided with a flange adapted to be opposed to a portion of the back of the escutcheon, there is no possibility of the interior of the cabinet being seen through a clearance between the mask and the escutcheon. Therefore, such clearance can be treated simply as a design-effect groove, providing an improved artistic effect. Moreover, the variation of the fixed position of the metal fixture of the cathode ray tube will not be observed from the front of the cathode ray tube, since such variation merely changes the depth of the groove between the mask and the escutcheon.

Further, according to this invention, since the mask and escutcheon are constructed as separate parts, they can be differentiated from each other by different colors already during manufacture of these separate parts without resorting to the conventional troublesome separate masking and painting.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
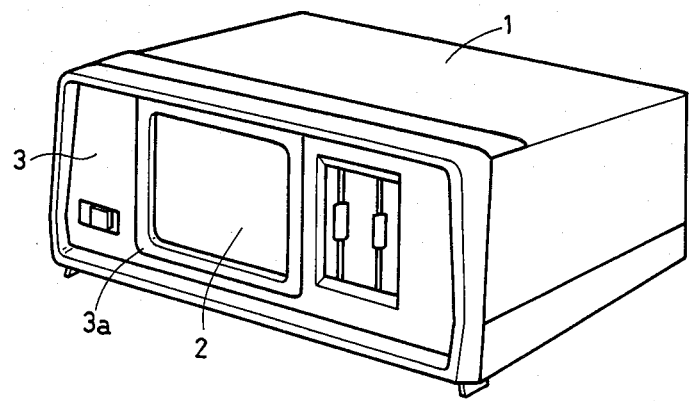
FIG. 1 is an external perspective view of a conventional portable computer using a cathode ray tube as a display.
Figure 2:
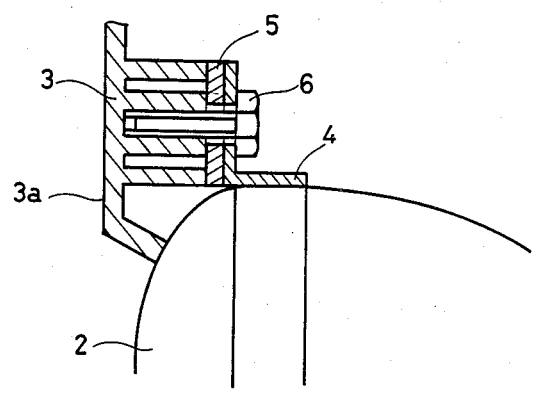
FIG. 2 is a sectional view of an escutcheon mounting structure in a conventional display.
Figure 3:
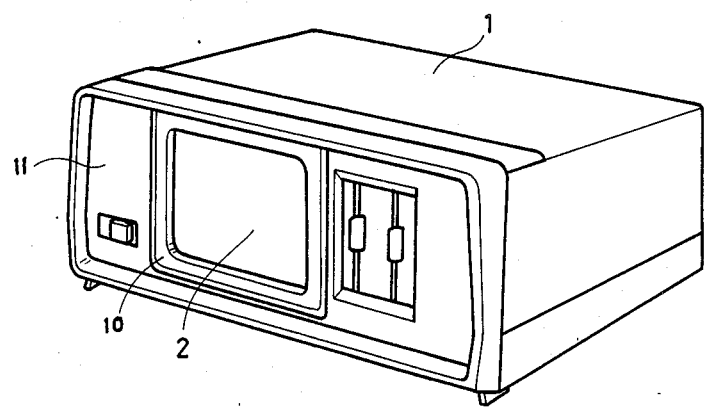
FIG. 3 is an external perspective view of a portable computer including an embodiment of the present invention.
Figure 4:
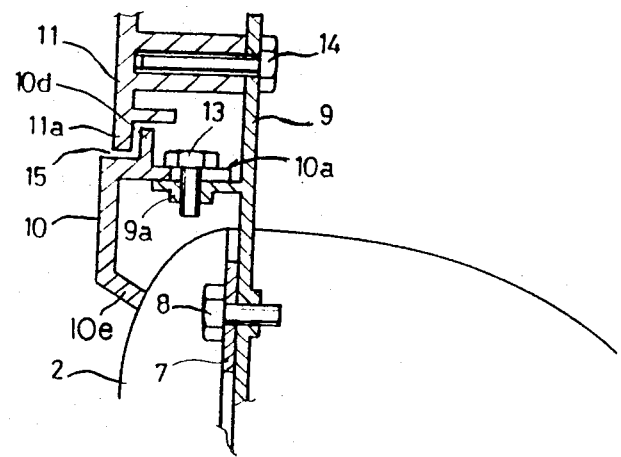
FIG. 4 is a sectional view showing the escutcheon and mask mounting structure of FIG. 3.

An embodiment of the invention will now be described with reference to FIGS. 3 and 4, wherein a cathode ray tube 2 has a metal fixture 7 secured thereto. The cathode ray tube 2 is fixed to an internal chassis 9 through this metal fixture 7 by a screw 8. The internal chassis 9 is fixedly installed in a cabinet 1.

Figures 5A, 5B:
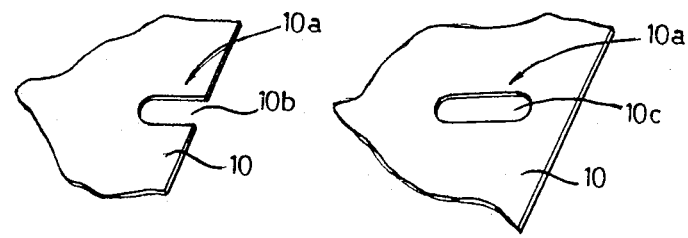
FIG. 5A is a view showing an example of mounted position adjusting means in the mask.
FIG. 5B is a view showing another example of mounted position adjusting means in the mask.

A characteristic feature of this embodiment is that a mask 10 and an escutcheon 11 are constructed as separate parts. The mask 10 and escutcheon 11 are mounted on the internal chassis 9. More particularly, the internal chassis 9 is formed with a mask mounting piece 9a projecting forwardly of the cathode ray tube 2, said mask 10 being fixed on the mask mounting piece 9a by a screw 13. The mounting portion 10a of the mask 10 resting on the internal chassis 9 is formed with a notch 10b shown in FIG. 5A or an elongated opening 10c shown in FIG. 5B. The notch 10b or elongated opening 10c receives the screw 13 and extends longitudinally of the cathode ray tube 2. With this arrangement, even if the fixed position of the metal fixture 7 varies for different cathode ray tubes 2 to be used, the clearance between the mask 10 and the cathode ray tube 2 can be eliminated by bringing the rim 10e of the mask 10 into contact with the surface of the cathode ray tube 2 and then fixing the mask 10 to the internal chassis 9 by tightening the screw 13.

After the mask 10 has been mounted on the internal chassis 9 in this manner, the escutcheon 11 is fixed to the internal chassis 9 by a screw 14.

The mask 10 is formed around its entire periphery with a flange 10d which is disposed behind the escutcheon 11 and extends outwardly of the cathode ray tube 2 and which is opposed to the back of the end portion 11a of the escutcheon 11 as seen from the front of the cathode ray tube 2. As a result, when the front of the cathode ray tube is observed, the flange 10d comes in sight through the clearance 15 between the mask 10 and the escutcheon 11, the interior of the cabinet 1 being invisible. Therefore, the clearance 15 looks like a simple design-effect groove for differentiating the mask 10 and the escutcheon 11 from each other.

In addition, even if the fixed position of the metal fixture 7 varies, in this embodiment the distance between the surface of the flange 10d and the back of the escutcheon 11 only varies with the variation in said fixed position, so that the variation, when seen from the front of the cathode ray tube, hardly catches the viewer's attention.

Since, as mentioned above, the mask 10 and the escutcheon 11 are constructed as separate parts, they may be painted with different colors as part of the manufacturing of these separate parts and the conventional troublesome masking and painting is avoided.

Figure 6:
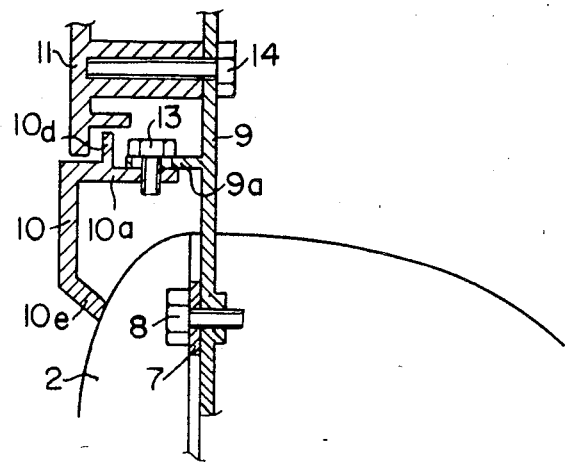
FIG. 6 is a sectional view similar to that of FIG. 4, but showing a modified mounting structure of the invention.
Figure 7A:
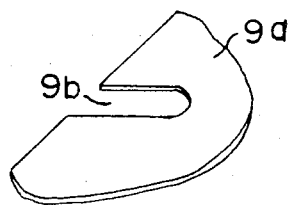
FIG. 7A is a view similar to FIG. 5A, but showing position adjusting means in the chassis.
Figure 7B:
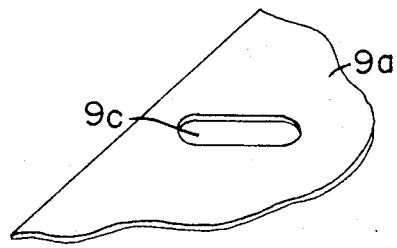
FIG. 7B is a view similar to FIG. 5B, but showing another position adjusting means in the chassis.

In addition, in the above embodiment, the mounting portion 10a of the mask 10 is provided with a notch 10b or an elongated opening 10c. However, the same effect is achieved if the notch 9b or the elongated opening 9c are formed in the mask mounting portion 9a of the internal chassis 9 as shown in FIGS. 6, 7A, and 7B. In this embodiment, the mounting portion 10a of the mask 10 will be formed with a threaded hole for threadedly receiving the screw 13, and the positional relation between the mounting portion 10a and the mask mounting portion 9a will be reversed as compared to FIGS. 4, 5A, and 5B.

While the above embodiment has been described with reference to a portable computer, the invention is not limited to portable computers. The invention is applicable to various apparatuses using a cathode ray tube, such as word processors and television sets.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus mounted to a peripheral rim to a cathode ray tube housed in a cabinet, comprising an escutcheon covering a front portion of said cabinet, a mask separate from said escutcheon covering a front peripheral edge of said cathode ray tube, an internal chassis fixedly installed in said cabinet, a fixture fixing said cathode ray tube to said internal chassis, said separate mask including a mask mounting portion for attaching said separate mask to said internal chassis, mounted position adjusting means for adjusting a mounted position of said separate mask longitudinally of said cathode ray tube, means for separately mounting said escutcheon to said internal chassis to surround said separate mask, and a flange formed on an outer periphery of said separate mask, said flange extending outwardly of said cathode ray tube so that said flange is opposed to a back portion of said escutcheon.

2. The apparatus of claim 1, further comprising screw means for securing said separate mask to said internal chassis, said screw means cooperating with said mask mounting portion and with said internal chassis, and wherein said mounted position adjusting means includes an elongated opening extending longitudinally of said cathode ray tube for slidably receiving said screw means for a position adjustment of said separate mask.

3. The apparatus of claim 2, wherein said elongated opening is formed in said mask mounting portion, said screw means extending through said elongated opening into said chassis.

4. The apparatus of claim 2, wherein said elongated opening is formed in said internal chassis, said screw means extending through said elongated opening into said mask mounting portion.

5. The apparatus of claim 1, further comprising screw means for securing said separate mask to said internal chassis, said screw means cooperating with said mask mounting portion and with said internal chassis, and wherein said mounted position adjusting means includes a notch extending longitudinally of said cathode ray tube for slidably receiving said screw means for a position adjustment of said separate mask.

6. The apparatus of claim 5, wherein said notch is formed in said mask mounting portion, said screw means extending through said notch into said chassis.

7. The apparatus of claim 5, wherein said notch is formed in said internal chassis, said screw means extending through said notch into said mask mounting portion.

8. The apparatus of claim 1, wherein said separate mask and said escutcheon are provided with different colors when the separate mask and said escutcheon are manufactured separately.

9. A mounting structure separately securing an escutcheon and a mask to a chassis supporting a cathode ray tube in a housing, comprising a chassis member extending radially relative to said cathode ray tube, first radially outwardly located means securing said escutcheon to said chassis member in an axially and radially fixed position so that said escutcheon surrounds a front rim of said cathode ray tube with a spacing between said cathode ray tube and said escutcheon, and second means for separately securing said mask to said chassis member in said spacing radially inwardly of said first securing means, said second securing means defining a radially fixed but axially adjustable position for said mask independently of said escutcheon.

* * * * *